Figure 1:
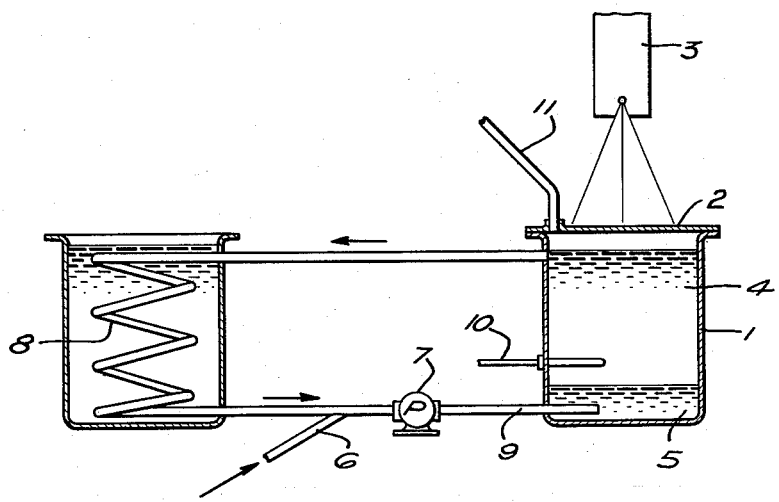

Nov. 6, 1962 R. P. TAYLOR 3,062,812
PROCESS FOR PRODUCTION OF CYCLIC KETOXIMES AND LACTAMS
FROM CYCLOALKANES BY MEANS OF IONIZING RADIATION
Filed April 23, 1959

RICHARD P. TAYLOR
INVENTOR.

BY Donald W. Canady

ATTORNEY 3,062,812
PROCESS FOR PRODUCTION OF CYCLIC KETOX-
IMES AND LACTAMS FROM CYCLOALKANES
BY MEANS OF IONIZING RADIATION
Richard P. Taylor, Costa Mesa, Calif., assignor to American Chemical Company, Los Angeles, Calif., a corporation of Delaware
Filed Apr. 23, 1959, Ser. No. 808,495
15 Claims. (Cl. 260—239.3)

This invention relates to an improved process for the manufacture of lactams and more particularly relates to a process for the preparation of lactams from cycloaliphatic hydrocarbons and a nitrosylating agent in the presence of ionizing radiation.

Lactams may be used for the production of nylon 6 which is suitable for use in filters, fabrics, coating compositions and similar applications. The Beckmann rearrangement of oximes, such as the ketoximes of cycloparaffins, has been the most commonly used process for the production of lactams. For example, caprolactam, the most important member of the lactam series, has long been prepared by the rearrangement of cyclohexanone oxime. Other lactams, for example, valerolactam, enantholactam, caprylolactam, etc., and substituted lactams may also be produced from their corresponding hydrocarbons, by the Beckmann process. Moderately elevated temperatures and a strong acid, such as sulfuric or hydrofluoric acid, are normally the rearrangement media used for the Beckmann process. This process for the production of lactams necessarily involves, as a preliminary step, the preparation of a cycloaliphatic-oxime. The oxime has been produced chemically by several methods, e.g., the treatment of aldehydes or ketones with hydroxylamine salts or the like, the oxidation of cycloamines, and the partial reduction of nitrocyclohydrocarbons by hydrogenation in the presence of a catalyst.

More recently, a photochemical process for the preparation of oximes has been proposed, whereby a cyclohexane is reacted with nitrosylchloride in the presence of ultraviolet light. In this process the excitation caused by ultraviolet light releases a chlorine atom from the nitrosylchloride which in turn splits off a hydrogen atom from the cyclohexane to give hydrogen chloride and an activated cyclohexane molecule (the cyclohexyl radical) which reacts with nitric oxide to form nitrosocyclohexane. Nitrosocyclohexane rapidly rearranges under conditions of reaction to produce the corresponding oxime. This photochemical process is economically unfeasible in that nitrosyl chloride is very corrosive because it readily absorbs light to form hydrogen chloride. Another undesirable aspect of this photochemical process is that numerous chlorinated side products, e.g., chloro nitrocyclohexane are formed which lower the oxime yield and present a separation problem.

Therefore, it is an object of the present invention to provide a process for the conversion of cycloaliphatics to the corresponding lactams wherein a nitrosylating agent and a strong acid are utilized.

It is also an object of the present invention to produce lactams from cycloaliphatic compounds by subjecting a mixture of a cycloaliphatic compound and nitric oxide to ionizing radiation and a strong acid.

A further object of my invention is to produce lactams from cycloaliphatic compounds in a continuous process.

Another object of my invention is to provide a means for continuously extracting the lactam from the cycloaliphatic stock. Other objects and a fuller understanding of my invention may be had by referring to the following description and examples taken in conjunction with the accompanying diagrams.

Briefly stated, my invention relates to the treatment of a liquid phase cycloaliphatic compound in which an appreciable amount of nitric oxide has been dissolved, with ionizing radiation and subjecting the radiation treated product to heat and a strong acid. The strong acid serves as a rearrangement agent for converting the radiation product into a lactam and may also serve to extract the lactam from the unconverted cycloaliphatic compound. The rearrangement or transformation of the oxime also takes place to a lesser extent without heating or treating with a strong acid catalyst.

My invention is useful for the production of lactams from cycloaliphatic hydrocarbons, for example, cycloparaffins, cycloolefins, substituted cycloolefins, substituted cycloparaffins, such as alcohols, ketones, amines, esters, halogenated compounds, etc. Examples of such cycloaliphatic compounds are cyclohexane, cyclopentane, cycloheptane, cyclooctane, cyclohexene, cyclopentene, cycloheptene, cyclooctene, cyclohexanol, cyclopentanol, cyclohexandiol, cyclohexanone, cyclopentanone, methylcyclohexanone, cyclohexylamine, cyclohexyldiamine, cyclohexylacetate, methyl cyclohexylcarboxylate, chlorocyclohexane, tribromocyclohexane, etc.

It has been found that the action of ionizing radiation on cycloaliphatic compounds facilitates the reaction of the cycloaliphatic compound with nitric oxide to form a nitroso cycloaliphatic compound which rapidly rearranges to the corresponding oxime. Although my invention is not to be so limited, it is postulated that the high energy radiation splits off a hydrogen atom from the cycloaliphatic molecule to yield the cycloalkyl radical. Since nitric oxide contains an un-paired electron, it readily reacts with the cycloalkyl radical to form the nitroso compound which rapidly rearranges to the oxime. Taking cyclohexane as an example, this reaction can be represented as follows:

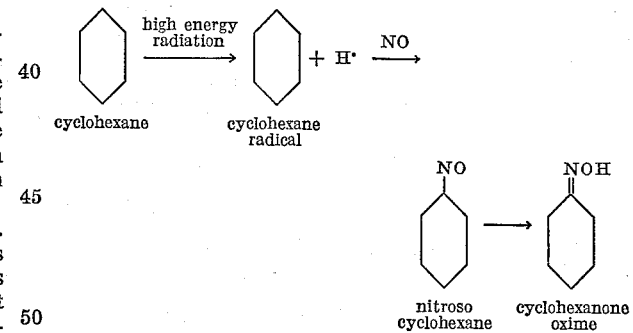

The rearrangement of ketoximes by the Beckmann process utilizing elevated temperatures and a strong acid catalyst as the rearrangement medium is well known. Among the strong acids which are suitable as the Beckmann rearrangement catalyst, are sulfuric acid, oleum, hydrofluoric acid, chlorosulphonic acid, trifluoroacetic acid, trichloroacetic acid, etc. Temperatures on the order of 50–160° C. are used for the Beckmann process, 100° C. being well suited to the process of my invention. The rearrangement reaction is highly exothermic and heat removal means are essential to control the reaction. Such heat removal may be effected by the use of cooling coils located in or adjacent to the reactor.

By continuously withdrawing the irradiated solution (nitroso and oxime compounds) and treating it with an insoluble strong acid, such as sulfuric or hydrofluoric acid, the nitroso and oxime compounds can be effectively extracted from the cycloaliphatic stock and, under the proper conditions, can be converted to lactams. Thus the insoluble strong acid may be used both as a selective solvent and as a catalyst in the Beckmann rearrangement of oximes to lactams. For purposes of this specification, a strong acid is one which is highly dissociated and an insoluble acid is one in which the oximes, lactams and other nitrosylated products are soluble and the cycloaliphatic stock is substantially insoluble. Some of the strong acids which are insoluble are sulfuric acid, oleum, hydrofluoric acid, and chlorosulphonic acid.

The high energy ionizing radiation required for the successful operation of my invention may be X-rays, alpha rays, beta rays, gamma rays, high-energy electrons, ions, etc. provided by linear accelerators, Van de Graaff generators, cyclotrons, resonance transformers, nuclear reactors, radioactive isotopes, used fuel rods from a nuclear reactor, or similar radiation sources. Beta rays from a radioactive isotope and high-energy electrons from an accelerator are suitable for treating the cycloparaffin in a small reaction vessel having a thin window to admit radiation. However, since this type of radiation is absorbed by less than one inch of liquid, a larger vessel or a pressure vessel having a greater wall thickness would require X-rays or gamma-rays which are substantially absorbed only by a greater depth of liquid and which will pass through a light metal vessel without appreciable reduction in intensity.

In general, electromagnetic radiation of wave lengths less than $2 \times 10^{-5}$ centimeters (2000 Angstroms) or particles of energy greater than about 1000 electron volts are required to accomplish my process.

Apparatus should be designed so that the acid catalyst used for the Beckmann process is not unduly subjected to high-energy radiation. When the acid is contained in the nitrosylating reactor, the acid forms a bottom layer so that the high energy radiation is almost completely absorbed by the upper hydrocarbon layer. When such a single reactor is used for both the nitrosylating step and the Beckmann reaction, the radiation should be of such a nature that it will be almost completely absorbed by the upper layer. For example, high energy electrons and beta rays may be completely absorbed in the upper layer.

Nitric oxide may be supplied by any nitrosylating agent which does not introduce noxious materials into the system. My preference is to use nitric oxide gas at a pressure sufficient to ensure solution of an appreciable amount of nitric oxide in the cycloaliphatic hydrocarbon. For the purpose of producing lactams by my process the amount of nitric oxide dissolved in the hydrocarbons may vary from a trace to the maximum amount which will dissolve in the given hydrocarbon at atmospheric pressure for example, cyclohexane, will dissolve up to 0.2 mole percent of nitric oxide gas and at 150 p.s.i., about 2 mole percent nitric oxide.

Apparatus shown in FIGURE 1 represents a simple system in which my invention can be practiced. Reactor 1 is sealed with an aluminum foil cover or window 2 through which radiation enters the reactor 1 from an external radiation source 3. A cycloaliphatic hydrocarbon and a strong acid are charged to reactor 1, forming an upper layer 4 (hydrocarbon) and a lower layer 5 (strong acid). Nitric oxide is introduced through inlet 6 into the lower layer 5 through which it passes to the hydrocarbon layer 4. The top portion of the upper layer is continuously pumped (pump 7) through cooling coils 8 and returned to the acid phase 5 through reactor inlet 9. Thus the heat liberated in the hydrocarbon as a result of the absorption of radiation and the heat generated by the exothermic rearrangement reaction in the acid is effectively controlled with thermocouple 10 and cooling coils 8 which may be immersed in ice water. Gas pressure in the reactor vessel 1 is regulated by gas vent 11 which may be routed through a condenser to recover volatiles. It is apparent that the oximes and other nitrosylated hydrocarbons are effectively extracted by the acid layer in this arrangement.

Figure 2:
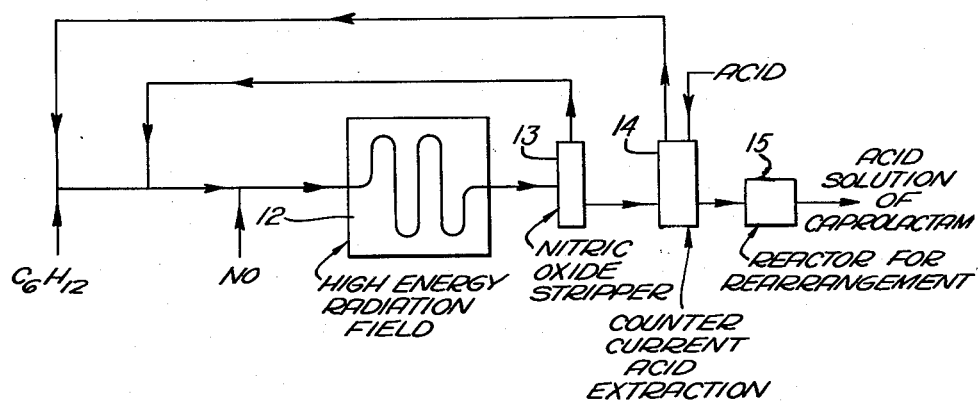

FIGURE 2 is a diagrammatic showing of a plant for the commercial production of lactams by irradiating cycloaliphatic-nitric oxide mixtures. The mixture is passed continuously through high energy radiation (gamma-rays) field 12 after which the mixture flows through a suitable nitric oxide stripper 13. The nitroso cycloaliphatic mixture is then extracted in an acid extraction plant 14, operating on the counter current acid extraction principle. The undissolved cycloaliphatic hydrocarbon and nitric oxide are recycled into the feed line. Acid extract from the extraction plant 14 is charged into a reactor or hold tank 15 to effect the rearrangement of the oxime to the corresponding lactam. This rearrangement is promoted by heating the acid solution of the oxime to 80–160° C. Pure lactam may then be recovered from the acid solution by neutralization, extraction with chloroform, and finally distillation under reduced pressure. When hydrofluoric acid is utilized the economics of the process is enhanced since this acid may be recovered by distillation and recycled, thus eliminating the neutralization step and the materials used therein. Since hydrofluoric acid boils at approximately 20° C. the rearrangement process when conducted at elevated temperatures in hydrofluoric acid must be conducted under pressure in a suitable pressure vessel. The hydrofluoric acid can then be recovered by releasing pressure. The following examples further illustrate the invention but should not be construed as limiting it in any way:

*Example I*

One liter of cyclohexane and 100 milliliters of 96% sulfuric acid were charged into a 1.5 liter stainless steel beaker equipped with external cooling coils immersed in cold water and a pump. The apparatus was such that liquid near the top of the beaker could be continuously circulated through the cooling coils and returned at the bottom of the beaker. Thus the nitrosylated cycloparaffins were continuously extracted by the sulfuric acid. The top of the beaker was sealed with thin aluminum foil such that high-energy electrons could be directed through this foil downward into the beaker and its contents with very little absorption of the radiation in the foil. Nitric oxide was continuously dispersed in the liquid from the bottom of the beaker after the system had been thoroughly flushed with nitrogen. Six-mev. electrons from a linear accelerator were then impinged upon the reactor in such a manner that they were totally absorbed in the upper (cyclohexane) layer. A total energy of $3.86 \times 10^5$ watt-sec. was absorbed over a period of 60 minutes. The temperature of the mixture was maintained at 20° C. during the irradiating treatment.

A portion of the sulfuric acid extract was removed from the beaker, mixed with an equal volume of fuming sulfuric acid (18% $SO_3$) and heated to 100° C. for 10 minutes. Upon cooling, the acid solution was poured on ice, neutralized with ammonia, saturated with ammonium sulfate and extracted with chloroform. Another portion of the original sulfuric acid extract was similarly treated but without adding fuming sulfuric acid or heating. The chloroform extracts were examined by infrared analysis. The weights of material recovered, expressed as grams present in the whole irradiated solution were:

|  | Before heating with fuming sulfuric acid, g. | After heating with fuming sulfuric acid, g. |
|---|---|---|
| Caprolactam | 3.0 | 7.4 |
| cyclohexanone oxime | 3.2 | 0.7 |
| cyclohexanone | 1.9 | 1.35 |

The above 7.4 g. yield of caprolactam represents approximately 1% conversion corresponds to a radiochemical yield of 1.6 molecules per 100 ev. which is equivalent to a radiation dosage of $5.8 \times 10^9$ rads at 100% conversion or $5.8 \times 10^7$ rads at 1% conversion. The total conversion to the oxime, 8.1 grams (7.4 g.+0.7 g.) corresponds to a radiation dosage of $5.6 \times 10^9$ rads or $5.6 \times 10^7$ rads at 1% conversion. Therefore a dosage of at least about $5 \times 10^7$ rads is required to produce significant yields in the present invention.

Example II

Example I was repeated with one liter of cyclopentane. A total energy of $3.95 \times 10^5$ watt-sec. was absorbed by the solution over a 60 minute period. Two portions of the acid extract were treated as in Example I except that the first portion was heated to 100° C. for 15 minutes rather than 10 minutes. The weights of material recovered, expressed as grams present in the whole irradiated solution, were:

|  | Before heating with fuming sulfuric acid, g. | After heating with fuming sulfuric acid, g. |
| --- | --- | --- |
| valerolactam | 0.80 | 6.2 |
| cyclopentanone oxime | 9.75 | 0.85 |
| cyclopentanone | 0.92 | 0.4 |

The 6.2 g. yield of valerolactam corresponds to a radiochemical yield of 1.5 molecules per 100 ev. which is equivalent to a radiation dosage of $6.6 \times 10^9$ rads at 100% conversion or $6.6 \times 10^7$ rads at 1% conversion.

The above examples illustrate the application of the present invention to the production of lactams from cycloparaffins. Although I have described my invention with a certain degree of particularity, this description is given only by way of example and it will be apparent to those skilled in the art that many variations are possible without departure from the scope of my invention as hereinafter set forth in the appended claims.

I claim:

1. A process for the preparation of ketoximes which comprises treating a mixture of a cycloaliphatic hydrocarbon and nitric oxide with high energy, ionizing radiation, the dosage of said radiation being sufficient to produce an appreciable amount of ketoximes.

2. A process for the preparation of lactams by the rearrangement of ketoximes of cycloaliphatic hydrocarbons which comprises treating a mixture of a cycloaliphatic hydrocarbon and nitric oxide with high energy, ionizing radiation, the dosage of said radiation being sufficient to produce an appreciable amount of lactam, and subsequently extracting the product of said radiation treatment from said hydrocarbon with an insoluble acid.

3. The process of claim 2 wherein the insoluble acid employed is sulfuric acid.

4. The process of claim 2 wherein the insoluble acid employed is hydrofluoric acid.

5. The process of claim 1 wherein the cycloaliphatic hydrocarbon treated is cyclopentane.

6. The process of claim 1 wherein the cycloaliphatic hydrocarbon treated is cyclohexane.

7. A process for the production of ketoximes which comprises treating a mixture of a cycloaliphatic hydrocarbon and nitric oxide with high energy, ionizing radiation, the dosage of said radiation being sufficient to produce an appreciable amount of ketoxime, and subsequently extracting the products of said treatment with an insoluble acid.

8. The process of claim 7 wherein the insoluble acid is sulfuric acid.

9. The process of claim 7 wherein the insoluble acid is hydrofluoric acid.

10. The process of claim 7 wherein the cycloaliphatic hydrocarbon is recycled.

11. A process for the preparation of ketoximes which comprises: treating a mixture of a cycloaliphatic hydrocarbon and nitric oxide in which the nitric oxide is present in an amount from a trace to 2 mole percent of said hydrocarbon with high energy ionizing radiation in the amount of at least $5 \times 10^7$ rads.

12. A process for the preparation of ketoximes which comprises: treating a mixture of a cycloaliphatic hydrocarbon and nitric oxide in which the nitric oxide is present in an amount from a trace to 0.2 mole percent of said hydrocarbon with at least $5 \times 10^7$ rads of ionizing radiation having a minimum intensity of 1000 electron volts.

13. A process for the preparation of ketoximes which comprises: treating a mixture of a cycloaliphatic hydrocarbon and nitric oxide in which the nitric oxide is present in an amount from a trace to 0.2 mole percent of said hydrocarbon with at least $5 \times 10^7$ rads of ionizing radiation having a minimum intensity of 1000 electron volts, and subsequently extracting the products of said radiation treatment from said hydrocarbon with an insoluble acid.

14. A process for the preparation of a nitrosocycloaliphatic hydrocarbon which comprises: treating a mixture of a cycloaliphatic hydrocarbon and nitric oxide in which the nitric oxide is present in an amount from a trace to 0.2 mole percent of said hydrocarbon with at least $5 \times 10^7$ rads of ionizing radiation having a minimum intensity of 1000 electron volts.

15. A process for the preparation of lactams by the rearrangement of cycloaliphatic hydrocarbons which comprises: treating a mixture of a cycloaliphatic hydrocarbon and nitric oxide in which the nitric oxide is present in an amount from a trace to 2 mole percent of said hydrocarbon with at least $5 \times 10^7$ rads of ionizing radiation having a minimum intensity of 1000 electron volts, and subsequently extracting the products of said radiation treatment from said hydrocarbon with an insoluble acid.

References Cited in the file of this patent

UNITED STATES PATENTS

| 2,885,332 | Mueller | May 5, 1959 |
| 2,940,913 | McKusic | June 14, 1960 |
| 2,940,914 | Hoover | June 14, 1960 |
| 2,952,597 | Cleaver et al. | Sept. 13, 1960 |

OTHER REFERENCES

Weissburger: Technique of Organic Chemistry, vol. III (1950), p. 100.

Fieser: Organic Chemistry, 3d ed., pages 701–703 (1956).

Noller: Chemistry of Organic Compounds, 2d ed. (1958), pp. 544–5.

UNITED STATES PATENT OFFICE
CERTIFICATE OF CORRECTION

Patent No. 3,062,812 November 6, 1962

Richard P. Taylor

It is hereby certified that error appears in the above numbered patent requiring correction and that the said Letters Patent should read as corrected below.

Column 4, line 71, for "represents" read -- representing.--.

Signed and sealed this 14th day of May 1963.

(SEAL)
Attest:

ERNEST W. SWIDER
Attesting Officer

DAVID L. LADD
Commissioner of Patents